(12) United States Patent
Yoo (10) Patent No.: US 9,136,772 B2
(45) Date of Patent: Sep. 15, 2015

(54) PHASE SHIFT TRANSFORMER IN MULTI-LEVEL MEDIUM VOLTAGE INVERTER

(75) Inventor: An No Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 294 days.

(21) Appl. No.: 13/599,890

(22) Filed: Aug. 30, 2012

(65) Prior Publication Data
US 2013/0076280 A1    Mar. 28, 2013

(30) Foreign Application Priority Data
Sep. 28, 2011    (KR) .................. 10-2011-0097961

(51) Int. Cl.
*H02P 23/00*    (2006.01)
*H02M 5/42*    (2006.01)

(52) U.S. Cl.
CPC ........................................ *H02M 5/42* (2013.01)

(58) Field of Classification Search
USPC ............. 318/400.3, 376, 813, 759, 780, 801, 318/807; 363/37, 71, 132, 65, 34; 323/215, 323/216, 218, 255; 307/82, 83
See application file for complete search history.

(56) References Cited

U.S. PATENT DOCUMENTS

| | | | | |
|---|---|---|---|---|
| 5,638,263 A | * | 6/1997 | Opal et al. ...................... | 363/65 |
| 6,014,323 A | * | 1/2000 | Aiello et al. .................... | 363/71 |
| 6,229,722 B1 | * | 5/2001 | Ichikawa et al. ................. | 363/71 |
| 6,340,851 B1 | | 1/2002 | Rinaldi et al. | |
| 2004/0119571 A1 | * | 6/2004 | Thibault et al. .................... | 336/5 |
| 2007/0058405 A1 | * | 3/2007 | Bousfield et al. ............. | 363/132 |
| 2010/0023896 A1 | * | 1/2010 | Rastogi et al. ..................... | 716/1 |
| 2010/0072824 A1 | * | 3/2010 | Abolhassani et al. .......... | 307/82 |
| 2012/0043922 A1 | * | 2/2012 | Jackson et al. ................. | 318/813 |

FOREIGN PATENT DOCUMENTS

| | | | |
|---|---|---|---|
| CN | 2405375 | | 11/2000 |
| CN | 101355321 | | 1/2009 |
| CN | 101355321 A | * | 1/2009 |
| JP | 2001196244 | | 7/2001 |
| JP | 2008295149 | | 12/2008 |
| JP | 2008295149 A | * | 12/2008 |
| JP | 2009232681 | | 10/2009 |

OTHER PUBLICATIONS

Japan Patent Office Application Serial No. 2012-185041, Office Action dated Jan. 28, 2014, 3 pages.
The State Intellectual Property Office of the People's Republic of China Application Serial No. 201210362466.7, Office Action dated Jun. 25, 2014, 6 pages.
Japan Patent Office Application Serial No. 2012-185041, Office Action dated Oct. 22, 2014, 2 pages.

* cited by examiner

*Primary Examiner* — Kawing Chan
*Assistant Examiner* — Jorge L Carrasquillo
(74) *Attorney, Agent, or Firm* — Lee, Hong, Degerman, Kang & Waimey (57) ABSTRACT

A phase shift transformer in a multi-level medium voltage inverter is disclosed, wherein structure is modularized to provide layout freedom and to reduce volume and weight of an entire system, and a continuous operation of a motor is enabled, even if one module is faulted.

5 Claims, 9 Drawing Sheets

PHASE SHIFT TRANSFORMER IN MULTI-LEVEL MEDIUM VOLTAGE INVERTER

Pursuant to 35 U.S.C. §119 (a), this application claims the benefit of earlier filing date and right of priority to Korean Patent Application No. 10-2011-0097961, filed on Sep. 28, 2011, the contents of which are hereby incorporated by reference in their entirety.

BACKGROUND OF THE DISCLOSURE

1. Field

The present disclosure relates to a phase shift transformer, and more particularly to a phase shift transformer for use in a multi-level medium voltage inverter.

2. Background

In general, a multi-level medium voltage inverter is an inverter having a root mean square value of an inputted line-to-line voltage ranging from 600 v or over, and an output phase voltage thereof is multi-leveled. The multi-level medium voltage inverter is configured to drive a motor having capacity of several kW to several MW in the fields such as a fan, a pump, a compressor, a traction device, a hoist and a conveyor.

A conventional medium voltage inverter may require a phase shift transformer at an input terminal for providing galvanic isolation, reducing harmonics, and supplying an input voltage to each power cell unit. The phase shift transformer, as one of constituent parts of the medium voltage inverter, takes a lion's share of volume and weight in the medium voltage inverter, such that its design is very important.

However, the conventional phase shift transformer, generally having an integrated configuration, suffers from drawbacks such as non-existence in degree of freedom in terms of design due to the integrated structure. Now, the conventional phase shift transformer will be described.

Figure 1:
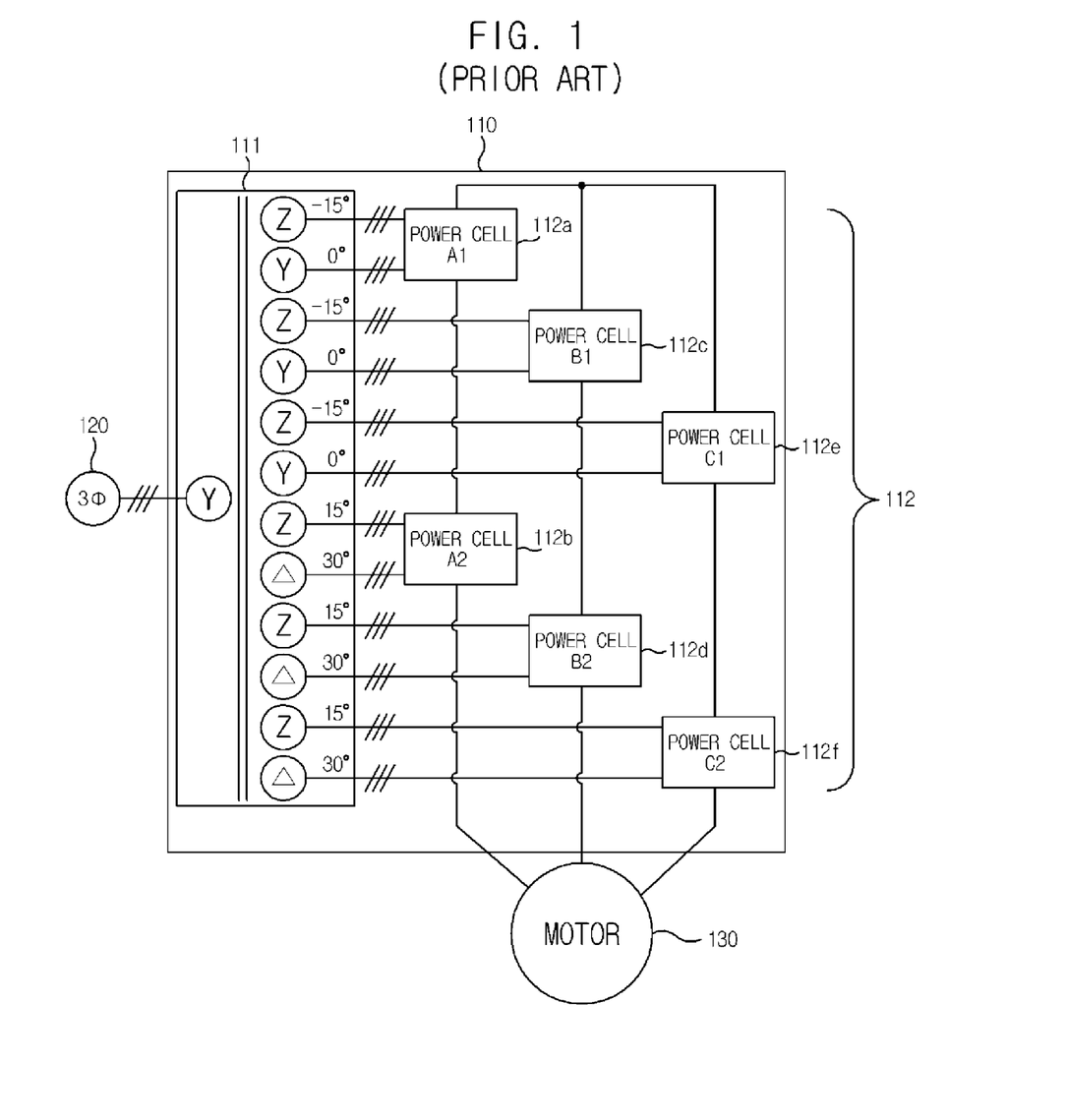
FIG. 1 is a schematic structural view of a multi-level medium inverter according to prior art.

FIG. 1 is a schematic structural view of a multi-level medium voltage inverter according to prior art.

Referring to FIG. 1, a conventional multi-level medium voltage inverter receives an input power from an input power unit (120) outputting a voltage whose root mean square value of an inputted line-to-line voltage is 600 volt or over, and converts the voltage to a load of a three-phase motor (130).

A primary winding of a conventional phase shift transformer (111) is composed of a three-phase Y connection, and a secondary winding is composed of a total of 12 windings, three windings each having a phase difference of −15°, 0°, 15°, 30° relative to the primary winding. Structure of the secondary winding is determined by the number of unit power cells (112). It can be noted from FIG. 1 that the inverter (110) has two unit power cells for each phase of the motor (130). That is, outputs of A1 and A2 power cells (112a, 112b) are connected in series to output an 'a' phase voltage of the three phase motor (130), B1 and B2 power cells (112c, 112d) output a 'b' phase voltage, and C1 and C2 power cells (112e, 112f) output a 'c' phase voltage.

The A1, B1 and C1 power cells (112a, 112c, 112e) are connected to an output having 15° and 0° phases, and A2, B2 and C2 power cells (112b, 112d, 120 are connected to an output having 15° and 30° phases.

Figure 2:
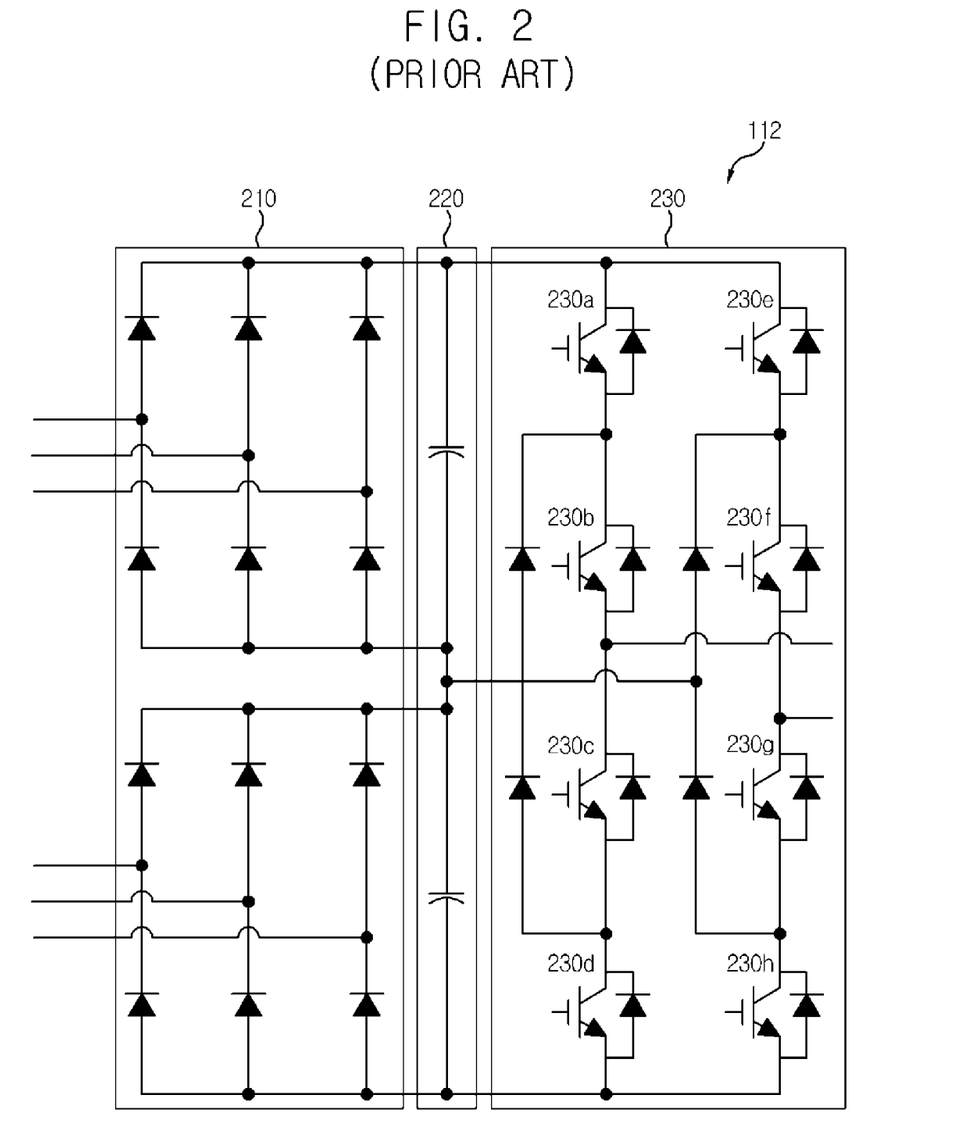
FIG. 2 is a schematic structural view illustrating a power cell of FIG. 1.

FIG. 2 is a configuration view of a power cell in FIG. 1. Referring to FIG. 2, a rectifying unit (210) receives two three-phase powers from the phase shift transformer (111) and rectifies the power to a DC voltage. To this end, the rectifying unit (210) includes two diode rectifiers. An output of the rectifying unit (210) is connected to serially-connected DC link capacitors, and each of the two DC link capacitors of a DC unit (220) has a same capacitance. An inverter unit (230) synthesizes output voltages of the DC unit (220) and an outputted line-to-line voltage is 5 levels.

Figure 3:
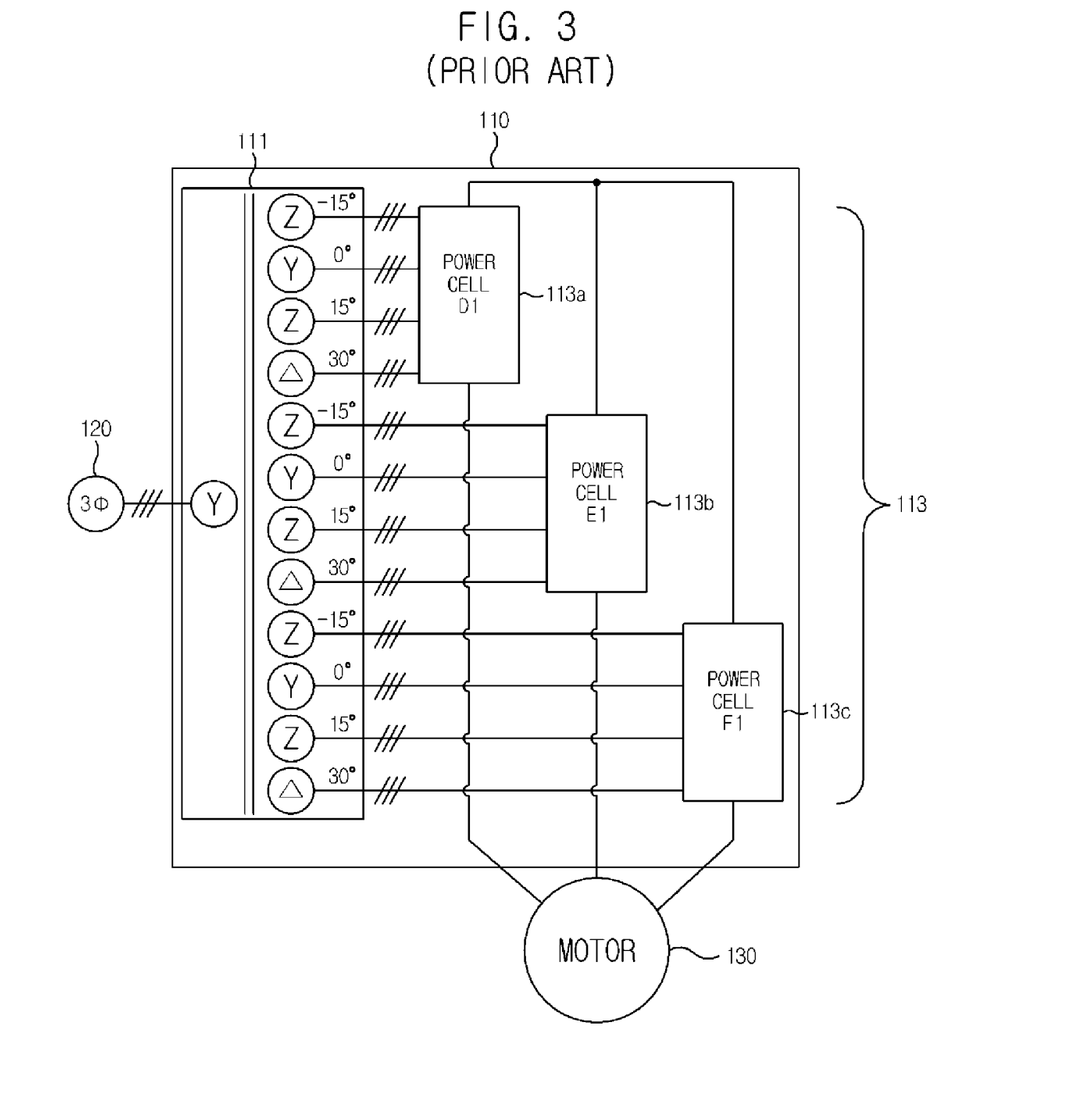
FIG. 3 is another structural view of FIG. 1.

Meantime, the convention medium voltage inverter of FIG. 1 may be configured as in FIG. 3. FIG. 3 is another configuration view of FIG. 1, and has the same configuration as in FIG. 1 except for configuration of a power cell (113).

The power cell (113) of FIG. 3 can synthesize output voltages of 5 levels. A D1 power cell (113a) can output an 'a' phase voltage of the motor (130), an E1 power cell (113b) can output a 'b' phase voltage of the motor (130), and an F1 power cell (113c) can output a 'c' phase voltage of the motor (130).

Figure 4:
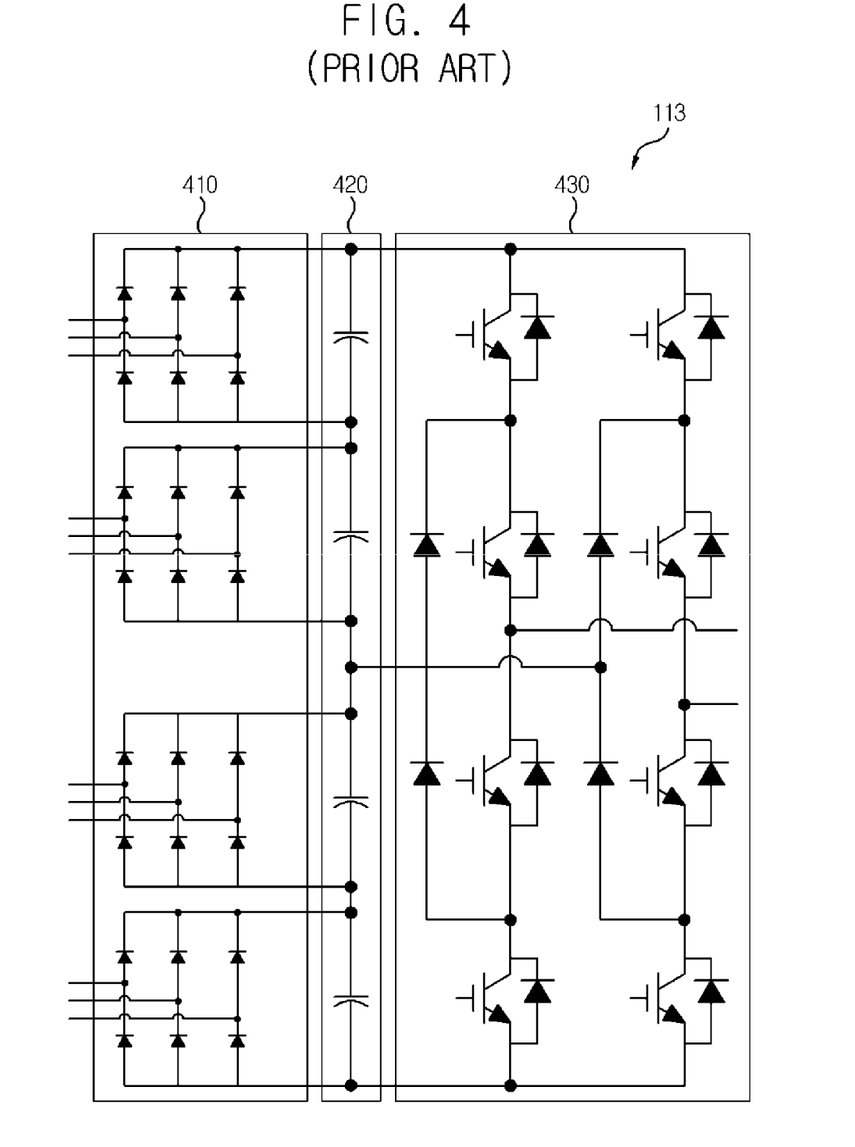
FIG. 4 is a schematic structural view illustrating a power cell of FIG. 3.

FIG. 4 is a configuration view of a power cell of FIG. 3.

Referring to FIG. 4, a rectifying unit (410) includes four diode rectifiers, and operation of an inverter unit (430) is same as in FIG. 2. However, the unit power cells in FIGS. 2 and 4 are different in rated voltage and rated current of power device used in response to required output. An output of the phase shift transformer (111) is inputted to the rectifying unit (410), and an output of the rectifying unit (410) is reflected on a DC unit (420).

First of all, an operation of the inverter unit (230) of FIG. 1 will be described.

Each leg of the inverter unit (230) in FIG. 2 includes four serially-arranged switches (230a, 230b, 230c, 230d), and an output voltage is defined by operation of each switch.

Switching operations of switches of 230a and 230b are complementary and switching operations of switches of 230c and 230d are also complementary. Thus, if each voltage of serially-connected DC link capacitors of the DC unit (220) is defined as E, and if switches of 230a and 230b are turned on, switches of 230c and 230d are turned off, and outputted pole voltage is E. Furthermore, if switches of 230a and 230c are turned on, switches of 230b and 230d are turned off, and pole voltage at this time is zero. Likewise, if switches of 230a and 230b are turned off, switches of 230c and 230d are turned on, and pole voltage at this time is −E.

According to the pole voltages thus defined, line-to-line voltages outputted by each of the unit power cells (112) of FIG. 1 are respectively 5 levels of 2E, E, 0, −E and −2E. Due to the line-to-line voltages outputted by each power cell (112) being defined as five levels, voltages synthesizable by A1 and A2 power cells (112a, 112b) of FIG. 1 are nine levels of 4E, 3E, 2E, E, 0, −E, −2E, −3E and −4E, and line-to-line voltages outputted to the motor (130) are 17 levels of 8E, 7E, 6E, 5E, 4E, 3E, 2E, E, 0, −E, −2E, −3E, −4E, −5E, −6E, −7E, and −8E.

Now, operation of the phase shift transformer (111) of FIGS. 1 and 3 will be described.

The phase shift transformer (111) applies an electrically-insulated 3-phase power to each power cell (112, 113) from an inputted 3-phase power. A primary winding of the phase shift transformer (111) is a Y-connection or a delta (Δ)-connection, and a secondary winding outputs a power with a shifted phase and magnitude adequate to requirement of the unit power cells (112, 113).

At this time, a number of an output from the secondary winding of the phase shift transformer (111) is same as a number of the diode rectifiers of rectifying units (210, 410) at the unit power cells (112, 113), and can be defined by the following Equation 1.

$$N_{sec} = 3 N_{unit} N_{diode} \quad \text{[Equation 1]}$$

where, $N_{sec}$ is the number of the output from the secondary winding of the phase shift transformer (111), $N_{unit}$ is the number of unit power cells (112, 113) connected to each phase of the motor (130), and $N_{diode}$ is the number of diode rectifiers included in one unit power cell (112, 113).

For example, because $N_{unit}$ is 2 in configurations of FIGS. 1 and 2, and $N_{diode}$ is 2, $N_{sec}$ becomes 12, and because $N_{unit}$ is 1, $N_{diode}$ is 4 in configurations of FIGS. 3 and 4, $N_{sec}$ becomes 12.

A phase shift angle of the secondary winding of the phase shift transformer (111) may be obtained by the following Equation 2.

$$\alpha_{sec} = \frac{360}{2N_{sec}} [\text{degree}] \quad [\text{Equation 2}]$$

where, $\alpha_{sec}$ is the phase shift angle between secondary windings. For example, if $N_{sec}$ becomes 12 as in FIGS. 1 and 3, the phase shift angle between secondary windings is 15°. An output voltage of each secondary winding from the phase shift angle between secondary windings thus determined is such that a phase relative to an input voltage at the primary winding is changed as much as the phase shift angle.

However, the abovementioned conventional multi-level medium voltage inverter is configured with a phase shift transformer in a single unit. The phase shift transformer structured with a single unit suffers from a disadvantage in that, because a required output must be satisfied by one transformer, size and weight of the transformer increase. Another disadvantage is that no layout freedom is available to increase an entire system volume-wise and to increase weight as well. Still another disadvantage is that if a problem occurs in the primary winding in the conventional phase shift transformer of single unit, an entire system is rendered inoperable.

SUMMARY OF THE DISCLOSURE

An exemplary aspect of the present disclosure is to substantially solve at least the above problems and/or disadvantages and to provide at least the advantages below. Accordingly, an aspect of the present disclosure provides a phase shift transformer in multi-level medium voltage inverter configured to modularize a structure, to provide layout freedom and to reduce volume and weight of an entire system.

Furthermore, another aspect of the present disclosure provides a phase shift transformer in multi-level medium voltage inverter configured to enable a continuous operation of a motor even if one module is in a fault state.

In one general aspect of the present disclosure, there is provided a phase shift transformer in multi-level medium voltage inverter including a plurality of power cells for driving a motor, the phase shift transformer comprising: a plurality of modularized phase shift transformers, wherein primary windings of the plurality of modularized phase shift transformers are phase-shifted to each other at a predetermined angle.

In some exemplary embodiments, secondary windings of the modularized phase shift transformers comprise a plurality of first connections and a plurality of second connections each phase-shifted at a predetermined angle.

In some exemplary embodiments, the first connection includes Y connection and the second connection includes delta (Δ) connection.

In some exemplary embodiments, any one of the plurality of modularized phase shift transformers supplies, as an input power, outputs of the first and second connections to three power cells respectively providing a 3-phase voltage to the motor in the plurality of power cells.

In some exemplary embodiments, the secondary windings of the modularized phase shift transformers comprise a plurality of connections each phase-shifted at a predetermined angle.

In some exemplary embodiments, any one of the modularized phase shift transformers supplies an input power to any one power cell of the plurality of power cells.

In some exemplary embodiments, an input of any one of the power cells is an output from any one of the plurality of connections in the modularized phase shift transformers.

In some exemplary embodiments, the plurality of modularized phase shift transformers supplies an input power to any one power cell of the plurality of power cells.

In some exemplary embodiments, an input of any one of the power cells is an output from the plurality of modularized phase shift transformers.

In some exemplary embodiments, the predetermined angle is determined by the following Equation:

$$\alpha_{prim} = \frac{360}{N_{m\_T}} \frac{1}{N_{sec\_out}} \frac{1}{N_{diode\_pulse}} [\text{degree}],$$

where, $N_{m\_T}$ is the number of modules of the modularized phase shift transformer, $N_{sec\_out}$ is the number of outputs at a secondary winding of the modularized phase shift transformer, and $N_{diode\_pulse}$ is the number of pulses of a diode rectifier of the power cell.

The phase shift transformer in multi-level medium voltage inverter according to the present disclosure has an advantageous effect in that a layout freedom is available to reduce the size of entire system, to increase redundancy of the entire system, whereby a stable operation can be maintained even if the phase shift transformer is faulted.

Other exemplary aspects, advantages, and salient features of the disclosure will become more apparent to persons of ordinary skill in the art from the following detailed description, which, taken in conjunction with the annexed drawings, discloses exemplary embodiments of the invention.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

In addition, the terms "-er", "-or", "part" and "module" described in the specification mean units for processing at least one function and operation and can be implemented by hardware components or software components, and combinations thereof.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 5:
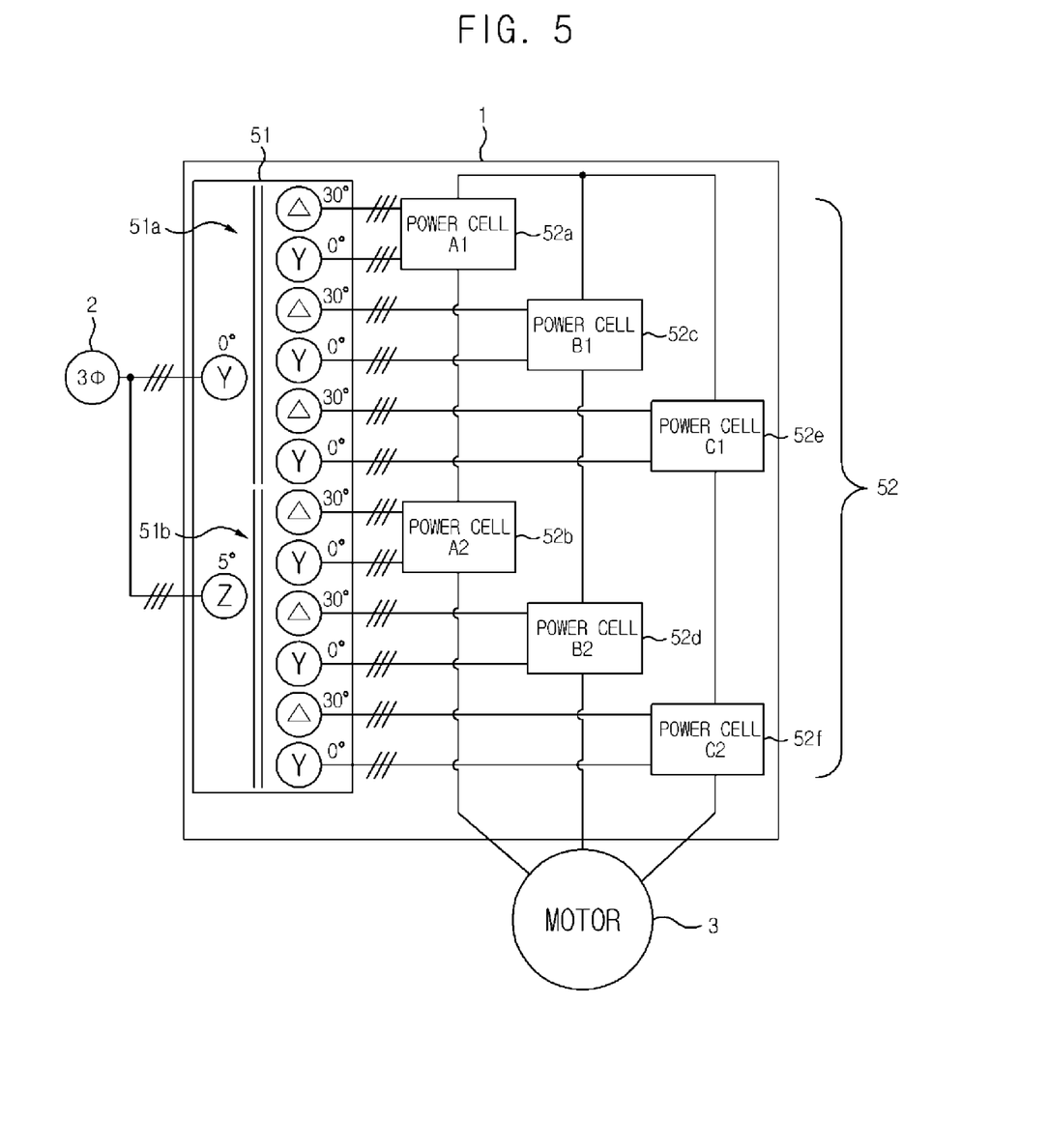
FIG. 5 is a schematic structural view of a phase shift transformer in a multi-level medium voltage inverter according to an exemplary embodiment of the present disclosure.

FIG. 5 is a schematic structural view of a phase shift transformer in a multi-level medium voltage inverter according to an exemplary embodiment of the present disclosure.

Referring to FIG. 5, a phase shift transformer (51) according to the present disclosure is included in a multi-level medium voltage inverter (1), where the inverter (1) converts a 3-phase power, whose root mean square value of line-to-line voltage from a 3-phase input power unit (2) is more than 600 v, to a 3-phase voltage driving a 3-phase motor (3).

The phase shift transformer (51) according to the present disclosure includes two modularized phase shift transformers (first module 51*a*, second module 51*b*). A primary winding of the first module (51*a*) includes a 3-phase Y-connection, and a secondary winding includes a Y-connection and a delta (Δ) connection, each phased-shifted at 0° and 30°.

The primary winding of the second module (51*b*) includes a phase-shifted Z connection, and structure of a secondary winding of the second module (51*b*) may be identical to that of the first module (51*a*).

In the exemplary embodiments of the present disclosure, an output voltage of a unit power cell (52) is 5 levels, and although the motor (3) is formed with two unit power cells for each phase, it should be apparent to the skilled in the art that the number of unit power cells may be extended as demands require.

Outputs of A1 and A2 power cells (52*a*, 52*b*) are serially connected to output an 'a' phase voltage for the motor (3), B1 and B2 power cells (52*c*, 52*d*) output a 'b' phase voltage, and C1 and C2 power cells (52*e*, 52*f*) output a 'c' phase voltage.

The A1, B1 and C1 power cells (52*a*, 52*c*, 52*e*) in FIG. 5 receive an output of the first module (51*a*), and the A2, B2 and C2 power cells (52*b*, 52*d*, 52*f*) in FIG. 5 receive an output of the second module (51*b*). Configuration of power cell (52) in FIG. 5 is same as that of FIG. 2, and detailed explanation thereto is omitted. Although FIG. 5 has exemplified the primary winding of the first module (51*a*) as Y connection and the primary winding of the second module (51*b*) as Z connection, the present disclosure is not limited thereto. Furthermore, configuration of secondary winding is not limited to that of FIG. 5, either.

Figure 6:
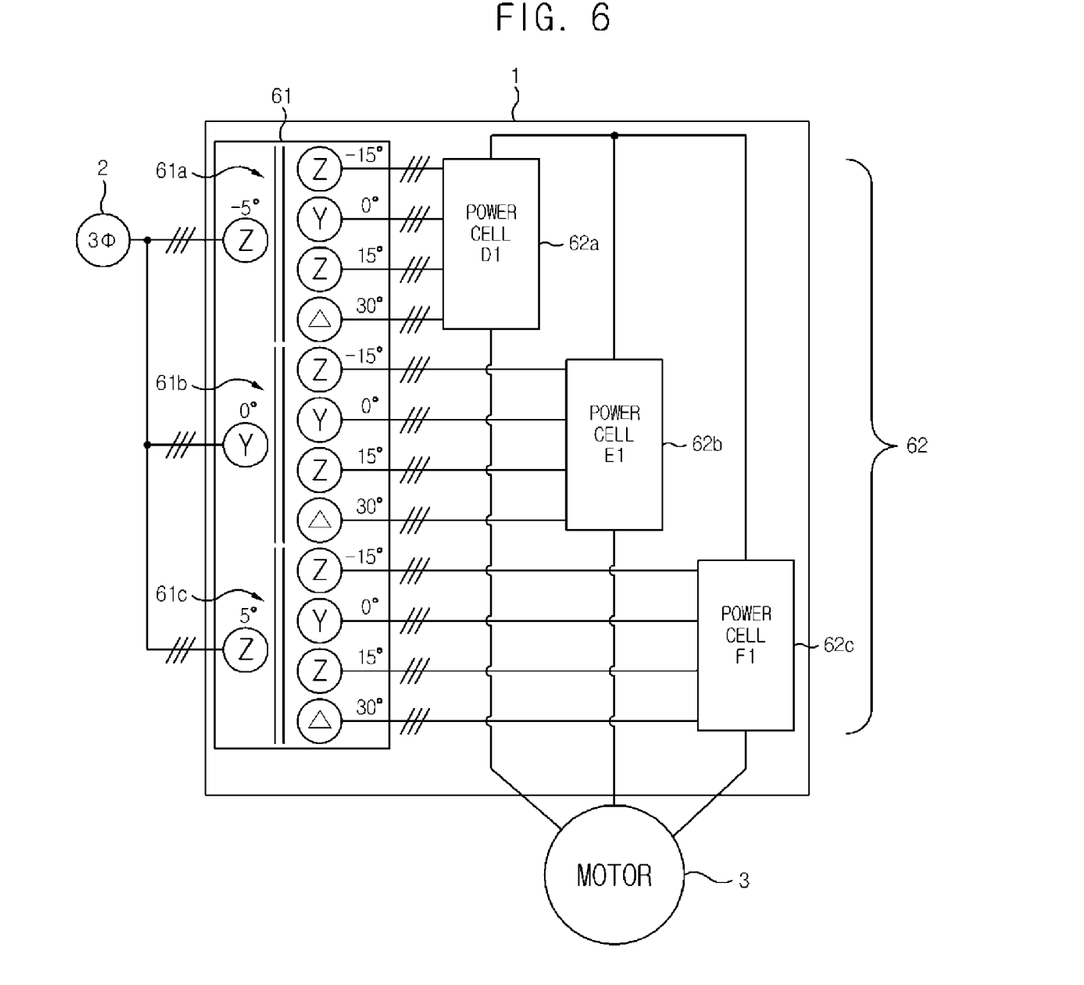
FIG. 6 is a schematic structural view of a phase shift transformer in a multi-level medium voltage inverter according to another exemplary embodiment of the present disclosure.

FIG. 6 is a schematic structural view of a phase shift transformer in a multi-level medium voltage inverter according to another exemplary embodiment of the present disclosure, where a phase shift transformer (61) is included inside the multi-level medium voltage inverter (1). The multi-level medium voltage inverter (1) converts a 3-phase power, whose root mean square value of line-to-line voltage from a 3-phase input power unit (2) is more than 600 v, to a 3-phase voltage driving a 3-phase motor (3).

Referring to FIG. 6, the phase shift transformer (61) according to the present disclosure includes three modularized phase shift transformers (first module 61*a*, second module 61*b*, and third module 61*c*).

A primary winding of the first module (61*a*) includes a 5° phase-shifted Z-connection, and a secondary winding includes −15°, 0°, 15° and 30° phase-shifted connections.

A primary winding of the first module (61*a*) includes a 0° phase-shifted Y-connection, and a secondary winding may be identical to that of the first module (61*a*). The primary winding of the third module (61*c*) includes a 5° phase-shifted Z connection, and structure of a secondary winding of the third module (61*c*) may be identical to that of the first module (61*a*).

A power cell (62) may combine an output voltage of 5 levels. A D1 power cell (62*a*) outputs an 'a' phase voltage for the motor (3), an E1 power cell (62*b*) outputs a 'b' phase voltage, and an F1 power cell (62*c*) outputs a 'c' phase voltage. The power cell (62) of FIG. 6 is preferably to have the same configuration as that of FIG. 4, such that detailed explanation thereto is omitted.

Although FIG. 6 has exemplified the primary windings of the first module (61*a*) and the third module (61*c*) as Z connection and the primary winding of the second module (61*b*) as Y connection, the present disclosure is not limited thereto. Furthermore, configuration of secondary winding is not limited to that of FIG. 6, either.

Figure 7:
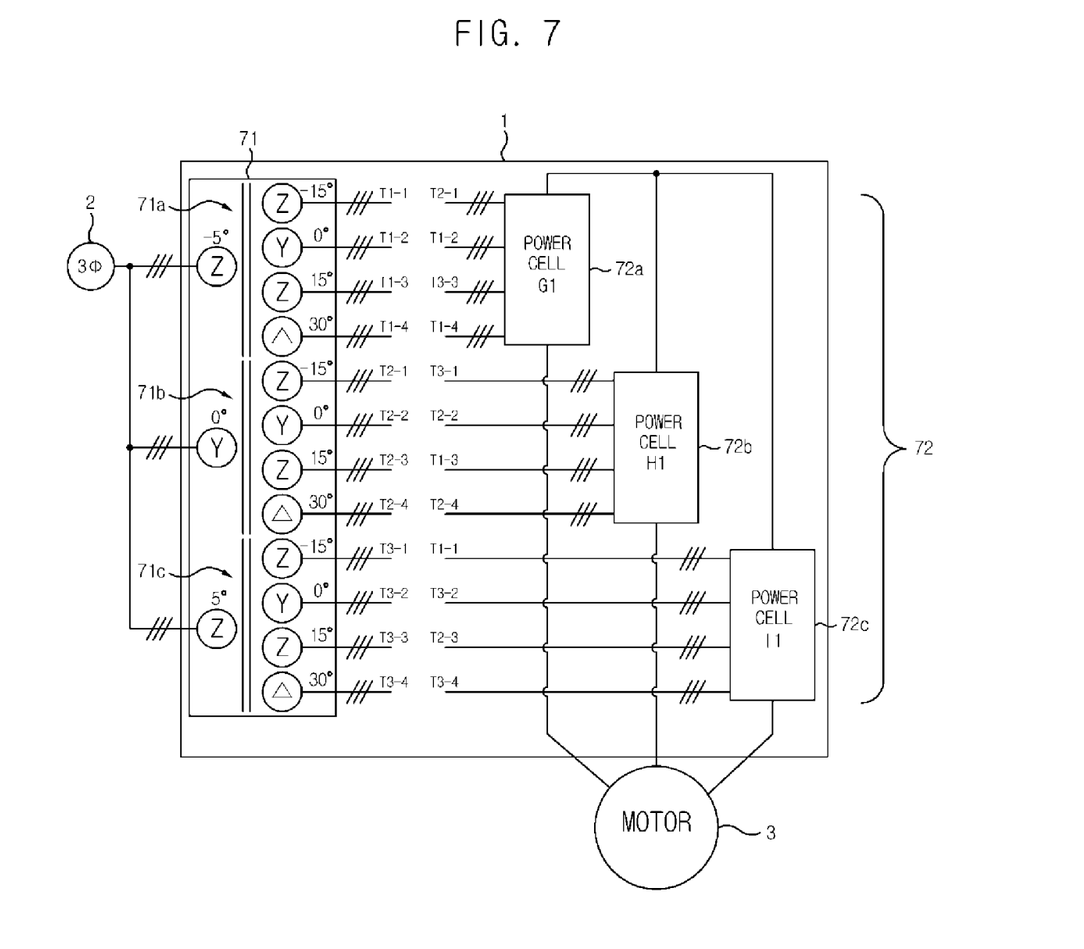
FIG. 7 is a schematic structural view of a phase shift transformer in a multi-level medium voltage inverter according to still another exemplary embodiment of the present disclosure.

FIG. 7 is a schematic structural view of a phase shift transformer in a multi-level medium voltage inverter according to still another exemplary embodiment of the present disclosure, where a phase shift transformer (71) is included inside the multi-level medium voltage inverter (1). The multi-level medium voltage inverter (1) converts a 3-phase power, whose root mean square value of line-to-line voltage from a 3-phase input power unit (2) is more than 600 v, to a 3-phase voltage driving a 3-phase motor (3).

Referring to FIG. 6, the phase shift transformer (71) according to the present disclosure includes three modularized phase shift transformers (first module 71*a*, second module 71*b*, and third module 71*c*).

The exemplary embodiment of FIG. 7 is different from FIG. 6 in terms of connection between the phase shift transformer and power cells, where in case of G1 power cell (72*a*), two input powers in four input powers are received from the first module (71*a*), one input power is received from the second module (71*b*), and the balance one is received from the third module (71*c*).

In case of H1 power cell (72*b*), two input powers in four input powers are received from the first module (71*b*), one input power is received from the second module (71*a*), and the balance one is received from the third module (71*c*). Likewise, in case of I1 power cell (72*c*), two input powers in four input powers are received from the third module (71*c*), one input power is received from the first module (71*a*), and the balance one is received from the third module (71*b*).

Although FIG. 7 has exemplified the primary windings of the first module (71*a*) and the third module (71*c*) as Z connection and the primary winding of the second module (71*b*) as Y connection, the present disclosure is not limited thereto. Furthermore, configuration of secondary winding is not limited to that of FIG. 6, either.

Figure 8:
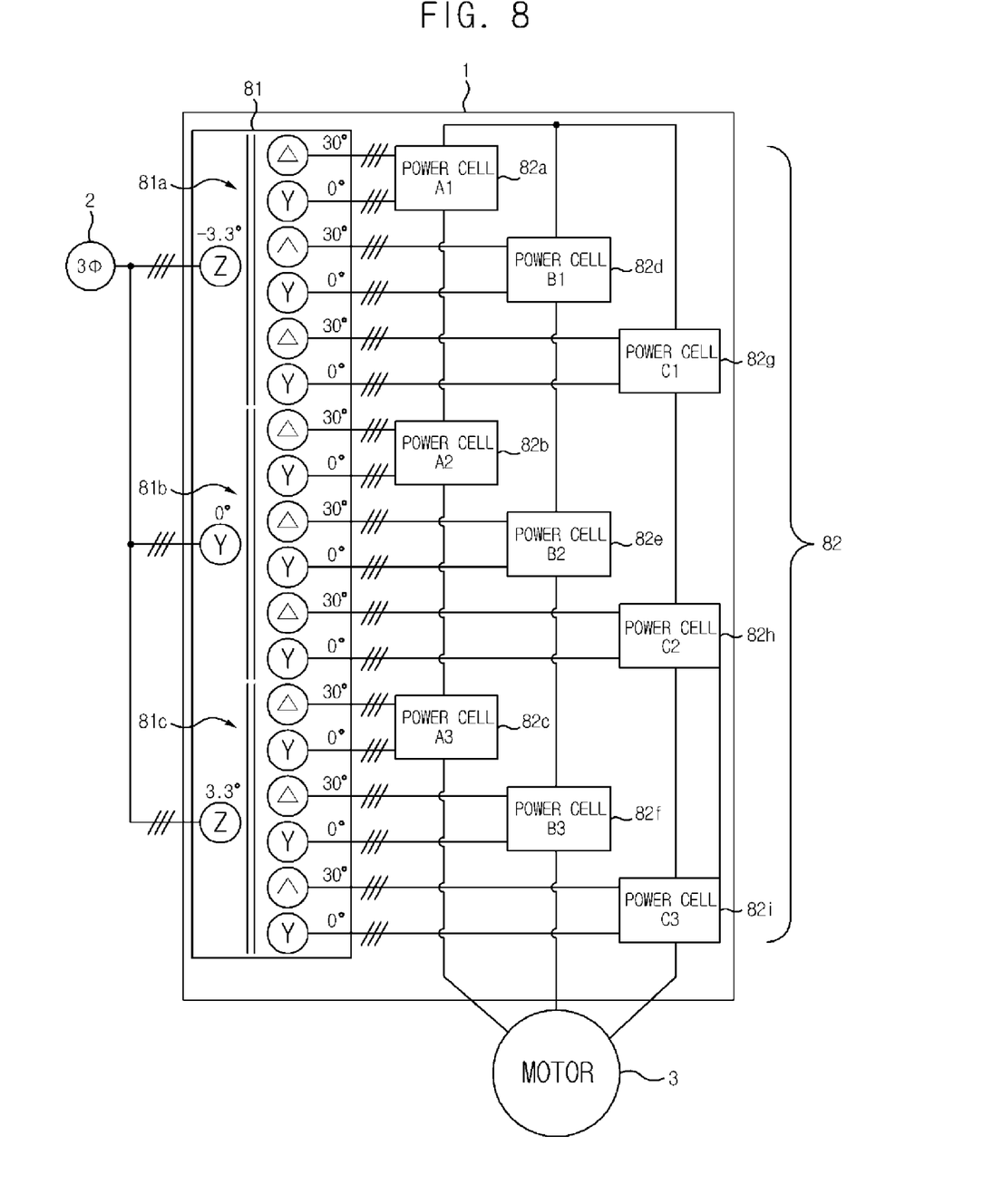
FIG. 8 is a schematic structural view of a phase shift transformer in a multi-level medium voltage inverter according to still another exemplary embodiment of the present disclosure.

FIG. 8 is a schematic structural view of a phase shift transformer in a multi-level medium voltage inverter according to still another exemplary embodiment of the present disclosure, where a phase shift transformer (81) is included inside the multi-level medium voltage inverter (1). The multi-level medium voltage inverter (1) converts a 3-phase power, whose root mean square value of line-to-line voltage from a 3-phase input power unit (2) is more than 600 v, to a 3-phase voltage driving a 3-phase motor (3).

Referring to FIG. 8, the phase shift transformer (81) according to the present disclosure includes three modularized phase shift transformers (first module 81*a*, second module 81*b*, and third module 81*c*).

A primary winding of the first module (81*a*) includes a −3.3° phase-shifted Z-connection, and a secondary winding includes 0° and 30° phase-shifted connections.

A primary winding of the second module (81*b*) includes a 0° phase-shifted Y-connection, and a secondary winding may be identical to that of the first module (81*a*). The primary winding of the third module (81*c*) includes a 3.3° phase-shifted Z connection, and structure of a secondary winding of the third module (81*c*) may be identical to that of the first module (81*a*).

A power cell (82) may combine an output voltage of 5 levels. A1, A2, and A3 power cells (82*a*~*c*) output an 'a' phase voltage for the motor (3), B1, B2, B3 power cells (82*d*~82*f*) output a 'b' phase voltage, and C1, C2 and C3 power cells (82*g*~82*i*) output a 'c' phase voltage. The power cell (82) of FIG. 8 is preferably to have the same configuration as that of FIG. 2, such that detailed explanation thereto is omitted.

Although FIG. 8 has exemplified the primary windings of the first module (81*a*) and the third module (81*c*) as Z connection and the primary winding of the second module (81*b*) as Y connection, the present disclosure is not limited thereto. Furthermore, configuration of secondary winding is not limited to that of FIG. 8, either.

Figure 9:
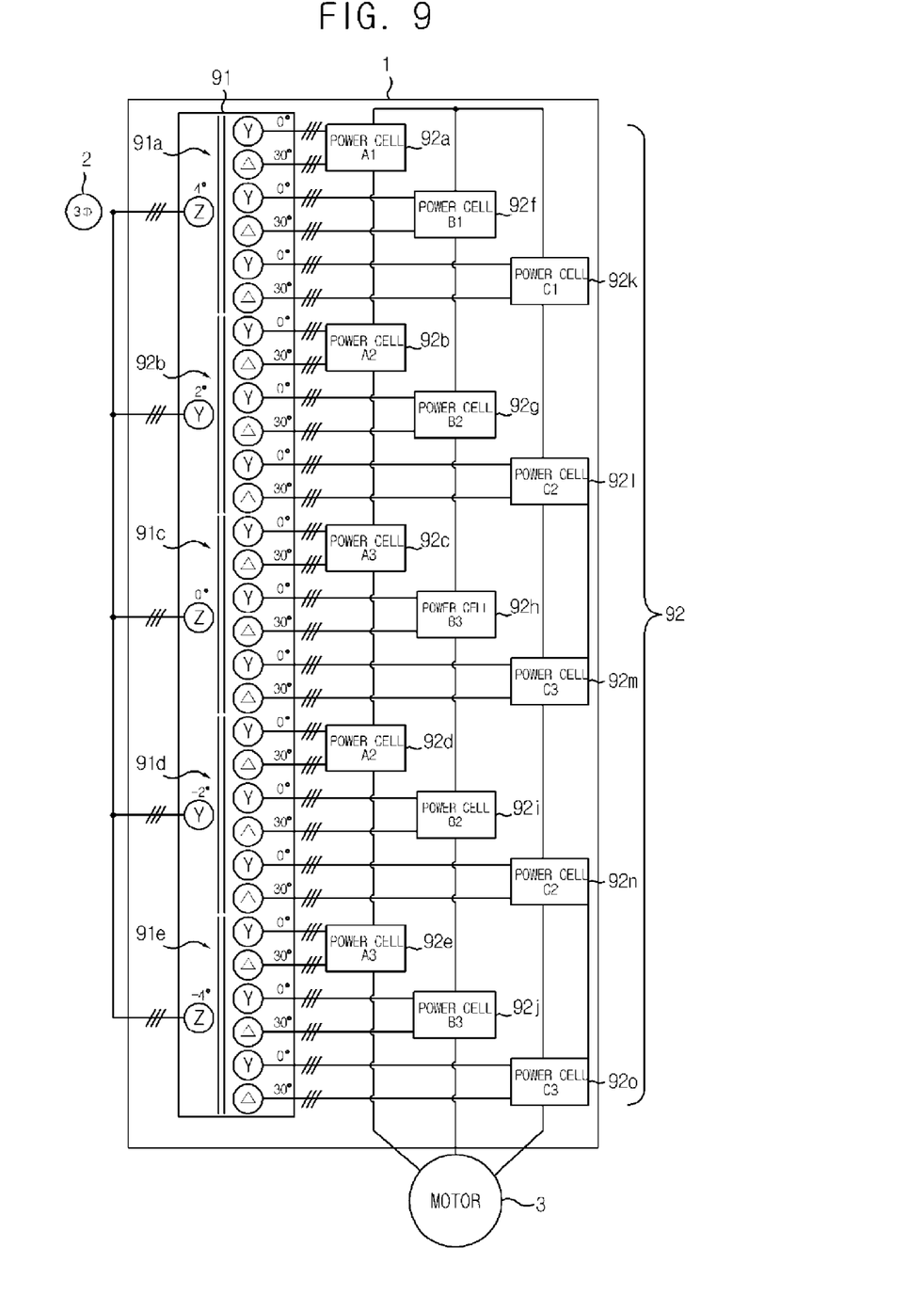
FIG. 9 is a schematic structural view of a phase shift transformer in a multi-level medium voltage inverter according to still another exemplary embodiment of the present disclosure.

FIG. 9 is a schematic structural view of a phase shift transformer in a multi-level medium voltage inverter according to still another exemplary embodiment of the present disclosure, where a phase shift transformer (91) is included inside the multi-level medium voltage inverter (1) and a 5-level of power cell for each phase of output is used. The multi-level medium voltage inverter (1) converts a 3-phase power, whose root mean square value of line-to-line voltage from a 3-phase input power unit (2) is more than 600 v, to a 3-phase voltage driving a 3-phase motor (3).

Referring to FIG. 9, the phase shift transformer (91) according to the present disclosure includes five modularized phase shift transformers (first module 91*a*, second module 91*b*, third module 91*c*, fourth module 91*d* and fifth module 91*e*).

A primary winding of the first module (91*a*) includes a −4° phase-shifted Z-connection, and a secondary winding includes 0° and 30° phase-shifted connections.

A primary winding of the second module (91*b*) includes a −2° phase-shifted Y-connection, and a secondary winding may be identical to that of the first module (91*a*). The primary winding of the third module (91*c*) includes a 0° phase-shifted Z connection, and structure of a secondary winding of the third module (91*c*) may be identical to that of the first module (91*a*).

A primary winding of the fourth module (91*d*) includes a 2° phase-shifted Y-connection, and a secondary winding may be identical to that of the first module (91*a*). The primary winding of the fifth module (91*e*) includes a 4° phase-shifted Z connection, and structure of a secondary winding of the fifth module (91*e*) may be identical to that of the first module (91*a*).

A power cell (92) may combine an output voltage of 5 levels. A1, A2, A3, A4 and A5 power cells (92*a*~92*e*) output an 'a' phase voltage for the motor (3), B1, B2, B3, B4 and B5 power cells (92*f*~92*j*) output a 'b' phase voltage, and C1, C2, C3, C4 and C5 power cells (92*k*~92*o*) output a 'c' phase voltage. Each power cell (92) of FIG. 9 is preferably to have the same configuration as that of FIG. 2, such that detailed explanation thereto is omitted.

Although FIG. 9 has exemplified the primary windings of the first module (91a), the third module (91c) and the fifth module (91e) as Z connection, and the primary windings of the second module (91b) and the fourth module (91d) as Y connection, the present disclosure is not limited thereto. Furthermore, configuration of secondary winding is not limited to that of FIG. 9, either.

The present disclosure is such that a conventional phase shift transformer configured in a single unit is modularized and used in a multi-level medium voltage inverter including the power cells shown in FIG. 2 or FIG. 4.

The power cells used in the present disclosure includes two or four diode rectifiers at an input terminal as shown in FIG. 2 or FIG. 4, and each output terminal of the diode rectifier is formed with DC link capacitors, where the DC link capacitors are serially connected to include a DC unit (220 or 420).

In a case each voltage of the DC link capacitor is defined as E, link-to-link voltages outputted by the unit power cells are respectively 2E, E, 0, –E and –2E. As illustrated in FIGS. 5 to 9, the power cells are serially connected to combine the outputted phase voltages, where level between the outputted phase voltage and the line-to-line voltage may be determined by the following Equations.

$$m=4H+1 \quad \text{[Equation 1]}$$

$$p=2m-1=8H+1, \quad \text{[Equation 4]}$$

where, m is the number of levels of outputted phase voltages, H is the number of unit power cells installed for each phase of the motor, and p is the number of levels of outputted line-to-line voltages.

A phase shift angle of secondary winding of the phase shift transformer according to the present disclosure is determined by the Equations 1 and 2. Furthermore, a phase shift angle of primary winding of the phase shift transformer according to the present disclosure is determined by the Equation 5.

$$\alpha_{prim} = \frac{360}{N_{m\_T}} \frac{1}{N_{sec\_out}} \frac{1}{N_{diode\_pulse}} \text{[degree]}, \quad \text{[Equation 5]}$$

where, $N_{m\_T}$ is the number of modules of the phase shift transformer, $N_{sec\_out}$ is the number of outputs at the secondary winding of a single phase shift transformer, and $N_{diode\_pulse}$ is the number of pulses of diode rectifier.

For example, in case of FIG. 5, $N_{m\_T}$ is 2, is 6, and $N_{diode\_pulse}$ is 6, whereby $\alpha_{prim}$ is 5°.

It is preferable that, based on the primary winding of the phase shift transformer being 0°, the phase shifting be made in the form of multiple of $\pm\alpha_{prim}$.

Capacity of modularized phase shift transformer according to the present disclosure has a relationship with capacity of the conventional single unit-type phase shift transformer in the following manner of Equation 6.

$$S_{m\_T} = \frac{S_{conv}}{N_{m\_T}}, \quad \text{[Equation 6]}$$

where, $S_{m\_T}$ is an apparent power of each modularized phase shift transformer according to the present disclosure, and $S_{conv}$ is an apparent power of the conventional single unit-type phase shift transformer.

The modularized phase shift transformer is advantageous over the conventional single unit type phase shift transformer in that capacity is small to reduce a winding window and to reduce an entire size and weight. As a result, size and weight of the phase shift transformer are reduced to reduce the size and weight of an entire system.

Furthermore, the modularized phase shift transformer according to the present disclosure has a transformer as small as $N_{m\_T}$, resultantly providing a layout freedom for an entire system and flexibility in design.

Lastly, although the conventional single unit type phase shift transformer is inoperable in an entire system if the primary winding is faulted, the modularized phase shift transformer according to the present disclosure is advantageous in that if a primary winding of one module at the modularized phase shift transformer is faulted, a power cell connected to the faulted module is detoured to enable a continued operation under a reduced output.

However, although a continued operation is impossible, in a case a primary winding of one module at the phase shift transformer of FIG. 6 is faulted, but if the structure is changed as shown in FIG. 7, an output of normal stated phase shift transformer is connected to all power cells to enable a continued operation under a reduced output state, even if a primary winding of one module at the phase shift transformer is faulted.

Thus, the modularized phase shift transformer in a multi-level medium voltage inverter according to the present disclosure has an industrial applicability in that redundancy of an entire system can be enhanced due to the structural characteristics thus described.

The above-mentioned phase shift transformer in a multi-level medium voltage inverter according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A phase shift transformer in multi-level medium voltage inverter, the phase shift transformer comprising:
   a plurality of modularized phase shift transformers; and
   a plurality of power cells for driving a motor, each of the plurality of power cells connected to the plurality of modularized phase shift transformers to receive a plurality of input power signals from each of the plurality of modularized phase shift transformers,
   wherein primary windings of each of the plurality of modularized phase shift transformers are phase-shifted to each other at a predetermined angle,
   wherein secondary windings of each of the plurality of modularized phase shift transformers comprise a plurality of connections each phase-shifted at the predetermined angle,
   wherein a first and second of at least four of the plurality of input power signals in a first of the plurality of power cells are received from a first phase shift transformer, a third of the at least four of the plurality of input power signals in the first of the plurality of power cells is received from a second phase shift transformer, and fourth of the at least four of the plurality of input power signals in the first of the plurality of power cells is received from a third phase shift transformer, wherein a first and second of at least four of the plurality of input power signals in a second of the plurality of power cells are received from the second phase shift transformer, a third of the at least four of the plurality of input power signals in the second of the plurality of power cells is received from the first phase shift transformer, and a fourth of the at least four of the plurality of input power signals in the second of the plurality of power cells is received from a third phase shift transformer, and wherein a first and second of at least four of the plurality of input power signals in a third of the plurality of power cells are received from the third phase shift transformer, a third of the at least four of the plurality of input power signals in the third of the plurality of power cells is received from the first phase shift transformer, and a fourth of the at least four of the plurality of input power signals in the third of the plurality of power cells is received from the second phase shift transformer.

2. The phase shift transformer of claim 1, wherein the secondary windings comprise a plurality of first connections and a plurality of second connections each phase-shifted at the predetermined angle.

3. The phase shift transformer of claim 2, wherein each of the plurality of first connections includes a Y connection and each of the plurality of second connections includes a delta (Δ) connection.

4. The phase shift transformer of claim 2, wherein any one of the plurality of modularized phase shift transformers supplies outputs of the plurality of first and second connections to each of the first, second and third of the plurality of power cells in order to provide a 3-phase voltage to the motor.

5. The phase shift transformer of claim 1, wherein the predetermined angle for each of the plurality of phase shift transformers is determined by the following Equation:

$$\alpha_{prim} = \frac{360}{N_{m\_T}} \frac{1}{N_{sec\_out}} \frac{1}{N_{diode\_pulse}} \text{[degree]},$$

where, $N_{m\_T}$ is a number of modules of the corresponding modularized phase shift transformer, $N_{sec\_out}$ is a number of outputs at a secondary winding of the corresponding modularized phase shift transformer, and $N_{diode\_pulse}$ is a number of pulses of a diode rectifier of each of the plurality of power cells.

* * * * *